United States Patent [19]

Maruyama

[11] Patent Number: 5,289,539
[45] Date of Patent: Feb. 22, 1994

[54] ECHO CANCELLER USING IMPULSE RESPONSE ESTIMATING METHOD

[75] Inventor: Yuisuke Maruyama, Tokyo, Japan

[73] Assignee: Nec Corporation, Japan

[21] Appl. No.: 757,951

[22] Filed: Sep. 12, 1991

[30] Foreign Application Priority Data

Sep. 12, 1990 [JP] Japan .................. 2-239938

[51] Int. Cl.$^5$ ............................. H04M 9/00
[52] U.S. Cl. .................. 379/410; 379/411; 379/407; 379/345; 370/32.1
[58] Field of Search ............ 379/406, 407, 410, 411, 379/345; 370/32.1

[56] References Cited

U.S. PATENT DOCUMENTS 4,479,036 10/1984 Yamamoto et al. .............. 379/410
5,131,032 7/1992 Esaki et al. .................. 379/406 X

OTHER PUBLICATIONS

Y. G. Tao, K. D. Kolwicz, C. W. Gritton and D. L. Duttweiler, "A Cascadable VLSI Echo Canceller," *IEEE Journal on Selected Areas in Communications*, vol. SAC-2, No. 2, Mar. 1984, pp. 297-303.

*Primary Examiner*—James L. Dwyer
*Assistant Examiner*—Paul A. Fournier
*Attorney, Agent, or Firm*—Ostrolenk, Faber, Gerb & Soffen

[57] ABSTRACT

An echo canceler having an FIR filter for removing an echo from a transmission input signal, the echo resulting from a reflection of a received signal through an echo path, and thereby outputting an output signal with the echo cancelled. The echo canceler includes an impulse response estimating system for estimating the impulse response of the echo path at a time t as a function of the received signal, the echo-cancelled output signal, and an estimated impulse response signal, and thereby outputting the estimated impulse response as the estimated impulse response signal; an echo signal estimating system for generating a predicted signal as a function of the estimated impulse response signal and the received signal, and outputting the predicted signal as an estimated echo signal; and a subtractor for subtracting the estimated echo signal from the transmission signal so as to produce the echo-cancelled output signal. The impulse response estimating system estimates the impulse response of the echo path as a function of the received signal and the echo-cancelled signal at the time t, and the received signal and echo-cancelled signal at a time $(t-M)$, M being a natural number.

4 Claims, 3 Drawing Sheets

ECHO CANCELLER USING IMPULSE RESPONSE ESTIMATING METHOD

BACKGROUND OF THE INVENTION

The present invention relates to an echo canceller using an FIR filter and, more particularly, to an echo canceller which increases the converging speed of an FIR filter.

A typical application of an echo canceller is to a hybrid transformer which implements the 2-wire/4-wire conversion of a telephone line or satellite communication line and generates an echo due to impedance mismatching between the 2-wire path and the 4-wire path. Another typical application is to a TV conference system or a voice conference system in which a loudspeaker and a microphone are acoustically coupled to generate an echo. In an echo canceller, an FIR filter estimates the impulse response of an echo path from a received input signal and then generates an estimated echo signal. The estimation of an impulse response requires multiplication and addition steps to be repeated a number of times within a short period of time. The number of such arithmetic operations increases with the duration of the impulse response. For example, the multiplication and addition steps have to be repeated several hundred times within about 100 milliseconds in the case of the estimation of an echo ascribable to the hybrid transformer of a telephone line or even several thousand times when it comes to the estimation of an echo ascribable to the turn-around of a speaker output to a microphone. To promote efficient echo estimation, there have been proposed various kinds of methods such as a normalized LMS (Least Mean Square) method and an RLS (Recursive Least Square) method.

The normalized LMS method may be denoted as follows:

$$y(j) = H(j)^t X(j) \quad (1)$$

$$e(j) = y(j) - \hat{y}(j) \quad (2)$$

$$H(j+1) = H(j) + \alpha e(j) X(j)/(X(j)^t X(j)) \quad (3)$$

where y(j), ŷ(j), e(j) and x(j) are respectively the estimated echo signal, transmission input signal, transmission output signal (difference output signal), difference between y(k) and ŷ(k)) and received input signal at a particular time j.

A received input vector X(j) and an estimated impulse response vector H(j) at a time j are defined as:

$$X(j) = [x(j), x(j-1), \ldots, x(j-N+1)]^t$$

$$H(j) = [h0(j), h1(j), \ldots, hN-1(j)]^t$$

where hi(j) is the estimated impulse response at a tap position i and at a time j. Further, α is a constant which is greater than zero and smaller than 2; the converging speed is highest when α is 1.

An echo canceller of the type which estimates an echo by the normalized LMS method is disclosed by, for example, YING G. TAO in "A Cascadable VLSI Echo Canceller", IEEE JOURNAL ON SELECTED AREAS IN COMMUNICATIONS, VOL. SAC-2, March 1984, pp. 297-303. Since the normalized LMS method is based on a statistical procedure, convergence occurs most rapidly with an input signal having no correlation, i.e., white noise. The maximum converging speed depends on the estimation order of the filter, and the convergence is completed after a number of repetitions which is about twenty times as great as the estimation order (about 30 dB in terms of the amount of echo cancellation). Assuming an acoustic echo canceller, the estimation order (number of taps) of the filter should be at least about 2,000 even when the sampling frequency is as high as 8 kilohertz, i.e., even then, more than five seconds is necessary for convergence. It follows that when the initial convergence of the path is changed, the echo is noticeably increased, which degrades the conversation quality in the communication system.

In light of the above, an echo canceller using the RLS method has also been proposed, which solves simultaneous equations to thereby produce an impulse response sequence H(j) uniformly. However, the RLS method is not practicable since it requires a prohibitive number of arithmetic operations, although it promotes rapid convergence and copes with changes of the initial convergence and path change, by comparison with the normalized LMS method.

SUMMARY OF THE INVENTION

It is, therefore, an object of the present invention to provide an FIR type echo canceller capable of promoting rapid convergence while reducing the ratio of increase in the required number of calculations.

In accordance with the present invention, an echo canceller for removing an echo signal, ascribable to the turn-around of a received signal to become a transmission signal to thereby output a signal with such echo cancelled, comprises impulse response estimating means for estimating the impulse response of the echo path at a time t in response to the received signal, the echo cancelled signal, and an estimated impulse response signal, thereby outputting the estimated impulse response as the estimated impulse response signal; echo signal estimating means for determining a predicted signal representative of a predicted echo signal from the estimated impulse response signal and the received signal, and outputting the predicted signal as an estimated echo signal; and subtractor means for subtracting the estimated echo signal from the transmission signal to produce the echo cancelled signal. The impulse response estimating means estimates the impulse response of the echo path as a function of the received signal and echo cancelled signal at the time t, and the received signal and echo cancelled signal at a time (t−M) (M being a natural number).

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENTS

Figure 1:
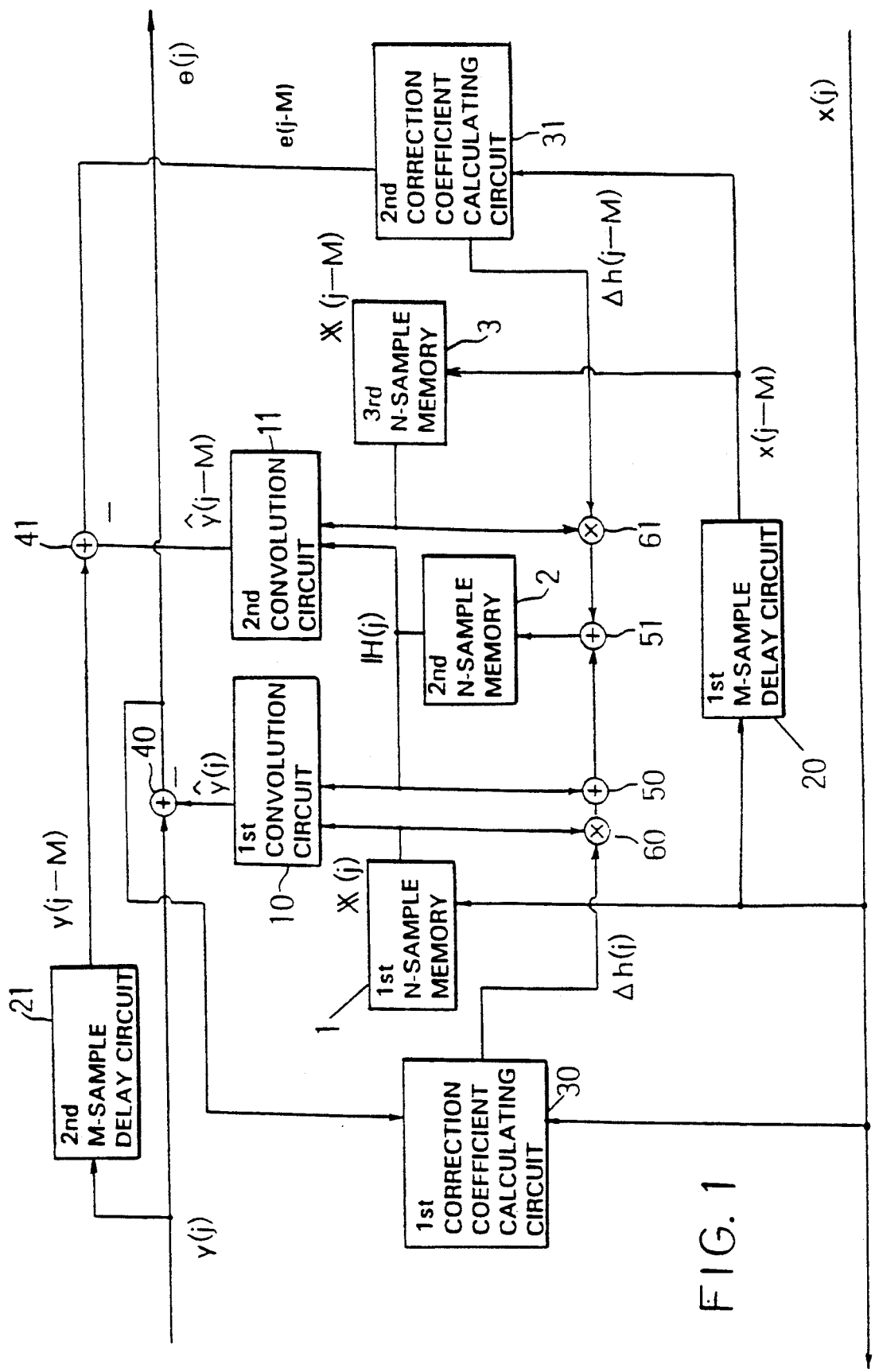
FIG. 1 is a block diagram schematically showing an echo canceller embodying the present invention.

To begin with, the principle of impulse response estimation particular to an echo canceller of the present invention will be described. The normalized LMS method estimates the impulse response of an echo path on the assumption that the received input vector appears randomly in the statistical aspect. However, since the received input signal vector is shifted in the direction of the time axis, the estimation of the impulse response is not practicable unless sampling is repeated a number of times ten to twenty times as great as the number of taps. On the other hand, to increase the converging speed, it is necessary to reduce the number of samplings necessary to complete the estimation. Therefore, if estimation is effected twice in a single sampling period, the number of times of repetition will be apparently increased and reduce the number of times of sampling. This kind of scheme, however, slows down the estimation when it comes to samples having strong correlation each other, e.g., two consecutive samples. To eliminate this problem, a received input signal and a transmission input signal are each provided with a sufficient delay to remove the correlation between sampled signals before parallel processing. When the present invention is implemented with the normalized LMS method, it may be denoted as follows:

$$y(j) = H(j)^t X(j) \quad (4)$$

$$y(j-M) = H(j)^t X(j-M) \quad (5)$$

$$e(j) = y(j) - \hat{y}(j) \quad (6)$$

$$e(j-M) = y(j-M) - \hat{y}(j-M) \quad (7)$$

$$H(j+1) = H(j) + \Delta h(j) X(j) + \Delta h(j-M) X(j-M) \quad (8)$$

where $$\Delta h(j) = \frac{\alpha e(j)}{X(j)^t X(j)}, \quad \Delta h(j-M) = \frac{\alpha e(j-M)}{X(j-M)^t X(j-M)}$$

Referring to FIG. 1, an echo canceller embodying the present invention is shown to which the normalized LMS method is applied. As shown, the echo canceller has first second and third N-sample memories 1-3, first and second M-sample delay circuits 20 and 21, first and second correction coefficient calculating circuits 30 and 31, first and second convolution circuits 10 and 11, first and second subtractors 40 and 41, first and second adders 50 and 51, and first and second multipliers 60 and 61.

A received input signal x(j) is applied to the first N-sample memory 1 and first M-sample delay circuit 20. In response, the N-sample memory 1 stores the N latest received input signals at any given time, i.e., it removes the oldest x(j−N) on receiving x(j). The M-sample delay circuit 20 delays the received input signal x(j) by M samples to output a delayed received input signal x(j−M). Further, the received input signal x(j) is applied to the first correction coefficient calculating circuit 30 and used to produce a first correction coefficient Δh(j) which will be described later. The delayed received input signal x(j−M) is fed to the third N-sample memory 3 and second correction coefficient calculating circuit 31. The third N-sample memory 3 may have the same construction as the first N-sample memory 1 and stores the N latest delayed received input signals at a given time. Having the same construction as the first correction coefficient calculating circuit 30, the second correction coefficient calculating circuit 31 produces a second correction coefficient Δh(j−M) in response to a first echo-cancelled signal e(j−M) fed from the second subtractor 41 and the first delayed received input signal x(j−M). The second N-sample memory 2 stores corrected impulse response hi(j) (i=0, 1, ..., (N −1)) fed from the second adder 51 and sequentially feeds them out. The received input signal vector X(j) and the impulse response vector H(j) from the first and second N-sample memories 1 and 2, respectively, are applied to the first convolution circuit 10, the vectors X(j) and H(j) having N elements each. In response, the convolution circuit 10 determines an estimated echo y associated with a transmission input signal y(j) according to the equation (4). Likewise, the second convolution circuit 11 receives the M-sample delayed received input signal vector X(j−M) and the impulse response vector H(j) from the third and second N-sample memory 3 and 2, respectively, and determines an estimated echo y(j−M) associated with an M-sample delayed transmission input signal y(j−M) according to the equation (5). The first subtractor 40 subtracts the estimated echo y(j) outputted by the first convolution circuit 10 from the transmission input signal y(j), outputting the resulted difference as a transmission output signal e(j). The transmission output signal e(j) is applied to the first correction coefficient calculating circuit 30 also. The second M-sample delay circuit 21 delays the transmission input signal y(j) by M samples to produce a delayed transmission input signal y(j−M). The second subtractor 41 subtracts the estimated echo y(j−M) outputted by the second convolution circuit 11 from the delayed transmission input signal Y(j−M), feeding the resulted difference signal e(j−M) to the second correction coefficient calculating circuit 31. The first multiplier 60 multiplies the first correction coefficient Δh(j) and the corresponding element of the received input signal vector X(j) to produce Δh(j) X(j). The first adder 50 adds H(j) to Δh(j) X(j) to output H(j)+Δh(j) X(j). Likewise, the second multiplier 61 produces Δh(j−M)X(J−M). As a result, the second adder 51 outputs H(j+1) (equation 8) and feeds it to the second N-sample memory 2. The construction described above executes parallel processing by estimating the impulse responses of two samples which are M samples remote from each other in a single sampling period, thereby increasing the converging speed. Since the embodiment uses an FIR filter having N taps, the estimated echo y(j) and the vectors including the impulse response vector H(j) have to be calculated with each of N elements. For example, Δh(j) X(j) is calculated by calculating Δh(j) xi(j) (i=0, 1, ..., N). In FIG. 1, control over the write-in and read-out of the first to third N-sample memories 1-3 and the output of the first and second correction coefficient calculating circuits can be readily implemented by a microprocessor, counter, etc., although those elements are not shown in the figure.

Figure 2:
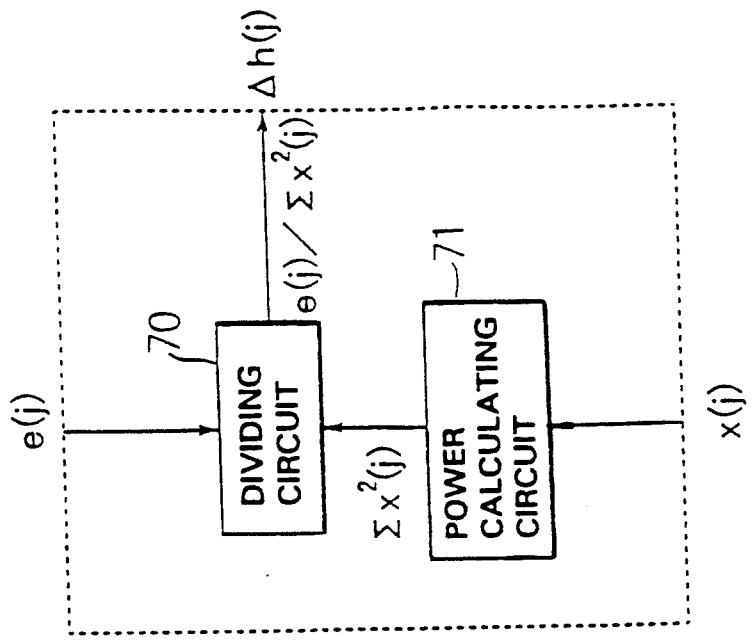
FIG. 2 is a circuit diagram showing a specific construction of a correction coefficient calculating circuit included in the embodiment of FIG. 1 and implemented with the normalized LMS method.

FIG. 2 shows a specific construction of the first correction coefficient calculating circuit 30 in FIG. 1. As shown, the correction coefficient calculating circuit 30 is made up of a power calculating circuit 71 having an N-sample memory, and a dividing circuit 70. FIG. 2 represents a case wherein the speed coefficient α is 1. The received input signal x(j) is written to the N-sample memory of the power calculating circuit 71 and, at the same time, is used to calculate the power of N samples $\Sigma x^2(j)$, i.e., $X(j) \cdot X(j)$ together with the past (N−1) samples. The dividing circuit 70 divides the transmission output signal e(j) from the first subtractor 40 by the power $\Sigma x^2(j)$ to produce $e(j)/(X(j) \cdot X(j))$ as $\Delta h(j)$. When $\alpha$ is not 1, a multiplier for multiplying the output of the dividing circuit 70 by $\alpha$ may be used. The second correction coefficient calculating circuit 31 may have the same construction as the circuit 30.

Figure 3:
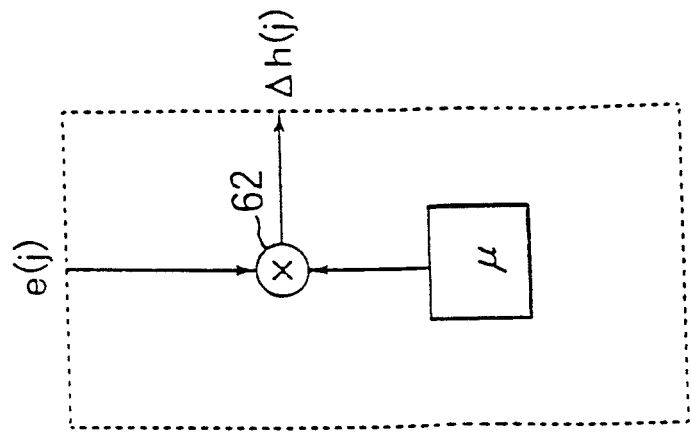
FIG. 3 is a circuit diagram similar to FIG. 2, showing another specific construction of the correction coefficient calculating circuit implemented with the LMS method.

FIG. 3 shows another specific construction of the correction coefficient calculating circuit 30 which is applicable to the LMS scheme wherein no normalization by the received input signal x(j) is effected. As shown, the circuit 30 multiplies the transmission output signal e(j) by a predetermined scaling factor $\mu$ by means of a multiplier 62, instead of dividing by the power $\Sigma x^2(j)$. The resulted product $\mu e(j)$ is outputted as $\Delta h(j)$. The circuit shown in FIG. 3 can be implemented with the arrangement shown in FIG. 1, except that the supply of the received input signal x(j) and delayed received input signal x(j−M) is not necessary. The scaling factor $\mu$ is determined in consideration of the dynamic range of the received input signal.

Figure 4:
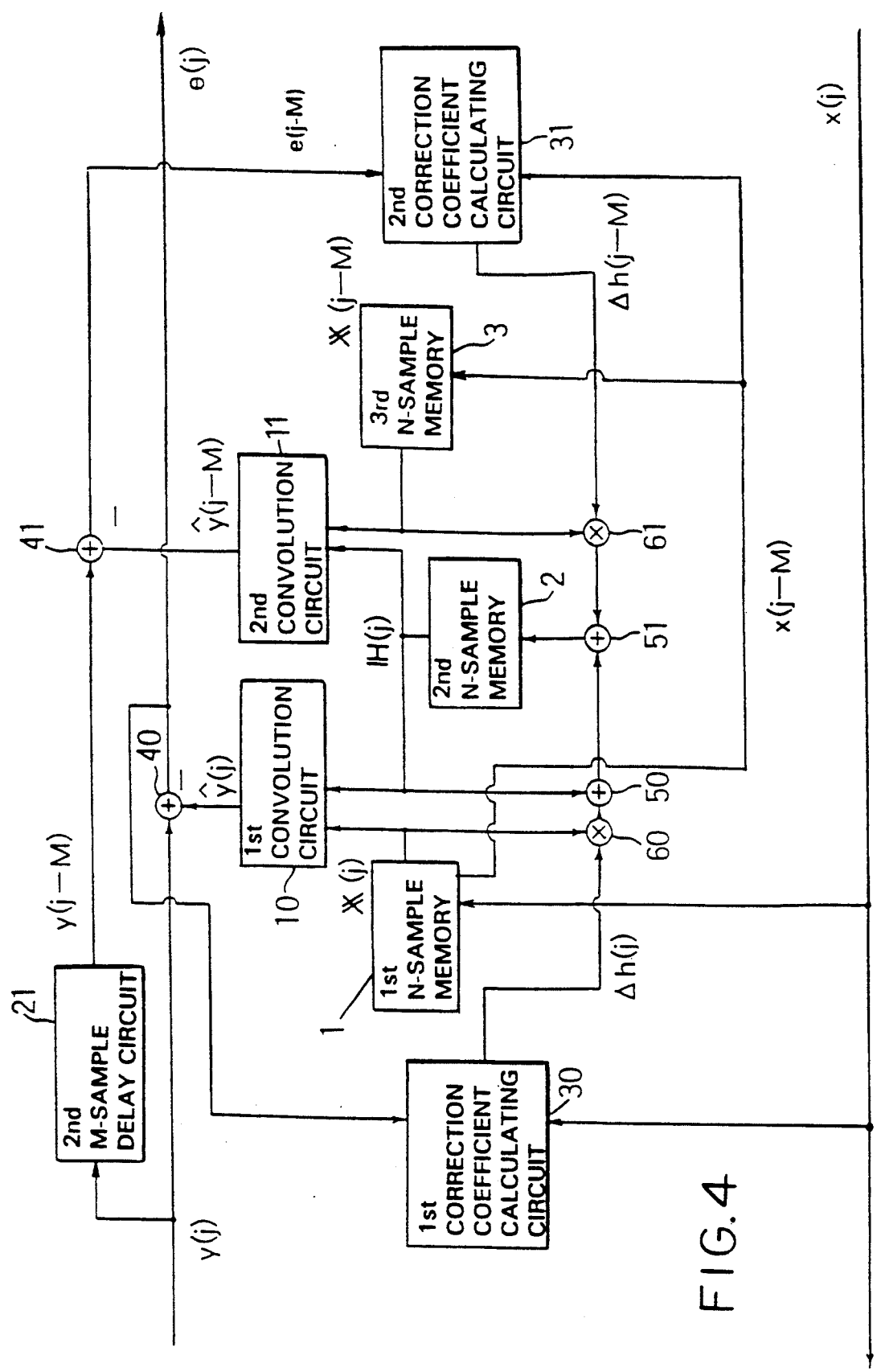
FIG. 4 is a block diagram schematically showing an alternative embodiment of the present invention.

FIG. 4 shows an alternative embodiment of the present invention which is practicable if M is smaller than or equal to N. Specifically, this embodiment omits the first M-sample delay circuit 20, FIG. 1, by using the fact that if M is smaller than or equal to N, the M-samples delayed received input signal x(j−M) is obtainable from the N-sample memory. The rest of the construction is identical with the embodiment shown in FIG. 1.

In any of the embodiments shown and described, N may be determined on the basis of the impulse response to be estimated. N increases with the duration of the impulse response to be estimated, as stated earlier. On the other hand, while any value other than 0 may be selected for M, small M's would increase the correlation between two samples to be processed in parallel and thereby decrease the converging speed. Specifically, when the present invention was implemented with the normalized LMS method, the converging speed was measured to be about 1.9 times as high as the conventional converging speed when N=M=256 and $\alpha$=1 or about 1.7 times as high as the latter when N=256 an M=128. Although the embodiments have concentrated on particular estimation algorithms, i.e., normalized LMS method and LMS method, the present invention is similarly practicable with an affine projection method or similar algorithm so long as it is based on the LMS method.

In summary, it will be seen that the present invention increases the converging speed by estimating the impulse responses of two M-sample remote samples at the same time.

What is claimed is:

1. An echo canceller using an FIR filter for removing an echo from at transmission input signal, the echo resulting from a reflection of a received signal through an echo path, comprising:
    a first memory for storing N latest samples of the received signal;
    a second memory for storing an N-th order impulse response of the echo path;
    a first delay circuit for delaying the received signal by M samples;
    a third memory for storing N samples of an output of said first delay circuit;
    a second delay circuit for delaying the transmission input signal by M samples;
    a first convolution circuit for multiplying and adding the outputs of said first and second memories;
    a second convolution circuit for multiplying and adding the outputs of said second and third memories;
    a first subtractor for subtracting the output of said first convolution circuit from the transmission input signal to produce a transmission output signal;
    a second subtractor for subtracting the output of said second convolution circuit from the output of said second delay circuit;
    a first correction amount calculating circuit for determining a first correction amount on the basis of the transmission output signal from said first subtractor and said received signal;
    a first multiplier for multiplying said first correction amount by the output of said first memory; 'a first adder for adding the output of said first multiplier to the impulse response from said second memory;
    a second correction amount calculating circuit for determining a second correction amount on the basis of the output of said second subtractor and the output of said first delay circuit;
    a second multiplier for multiplying said second correction amount by the output of said third memory; and
    a second adder for adding the output of said second multiplier to the output of said first adder and feeding back the resulting sum to said second memory.

2. An echo canceller as claimed in claim 1, wherein said first correction amount calculating circuit comprises:
    a first power circuit for determining the power of N samples of the received signal; and
    a first divider for dividing the output of said first subtractor by the output of said first power circuit to produce said first correction amount;
    said second correction amount calculating circuit comprising:
    a second power circuit for determining the power of N samples of the output of said first delay circuit; and
    a second divider for dividing the output of said second subtractor by the output of said second power circuit to produce said second correction amount.

3. An echo canceller as claimed in claim 1, wherein said first correction amount calculating circuit comprises a third multiplier for multiplying the output of said first subtractor by a predetermined value $\mu$ to produce said first correction amount;
    said second correction amount calculating circuit comprising a fourth multiplier for multiplying the output of said second subtractor by a predetermined value $\mu$ to produce said second correction amount.

4. An echo canceller as claimed in claim 1, wherein M is smaller than or equal to N, and the first delay circuit consists of a portion of said first memory which delays the received signal by M samples.

* * * * *